Figure 20:
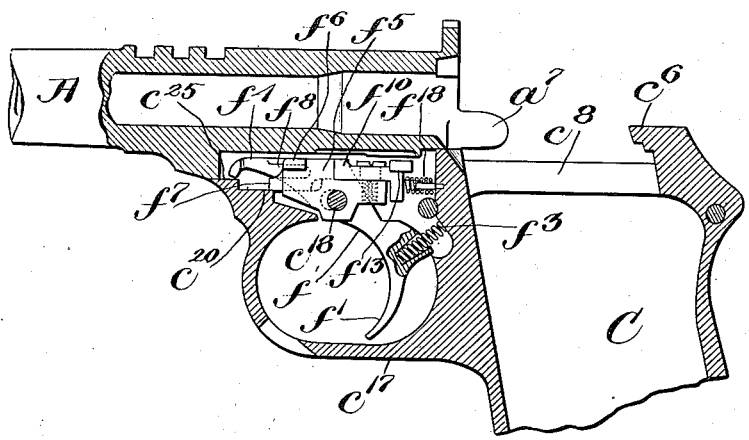

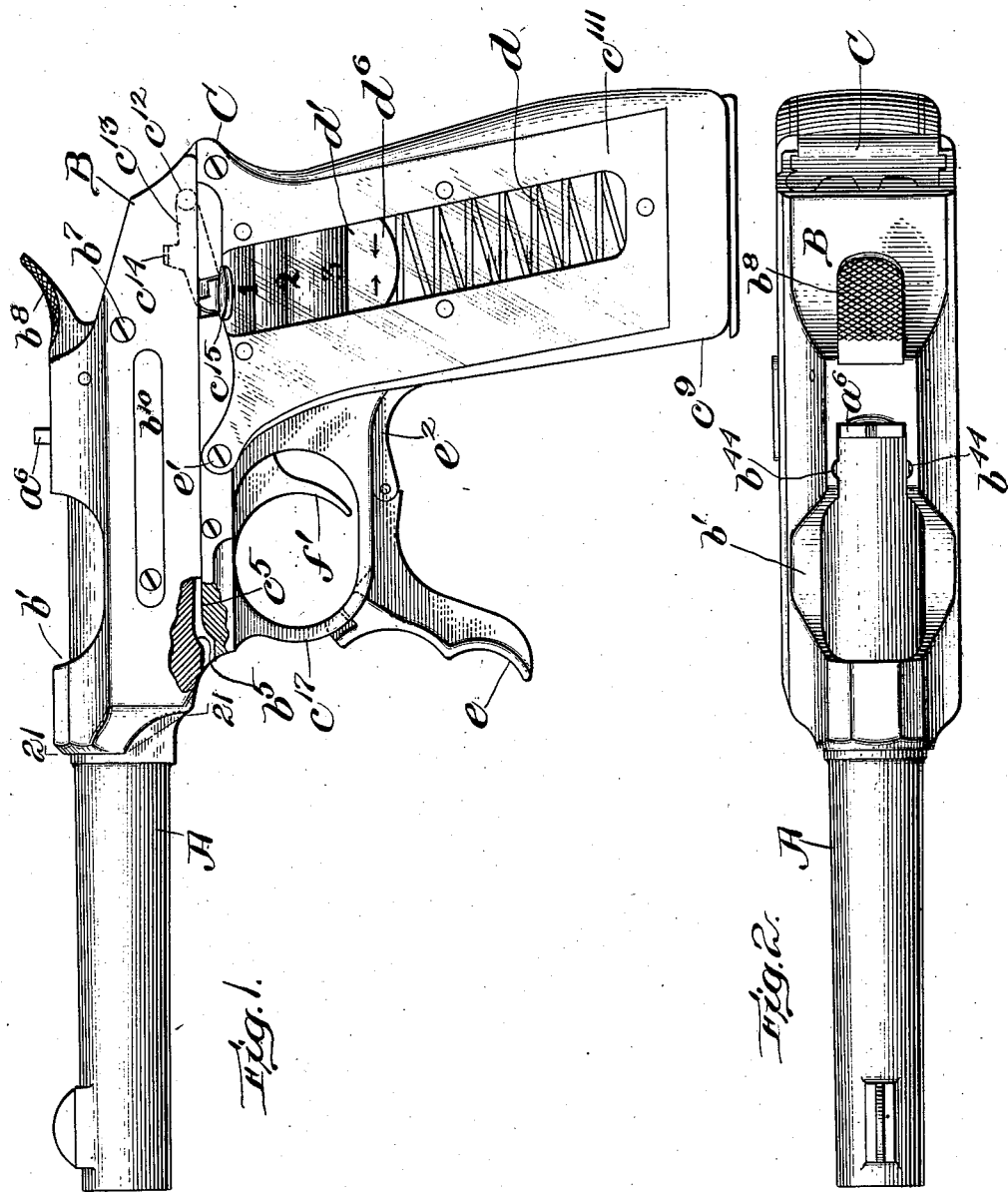

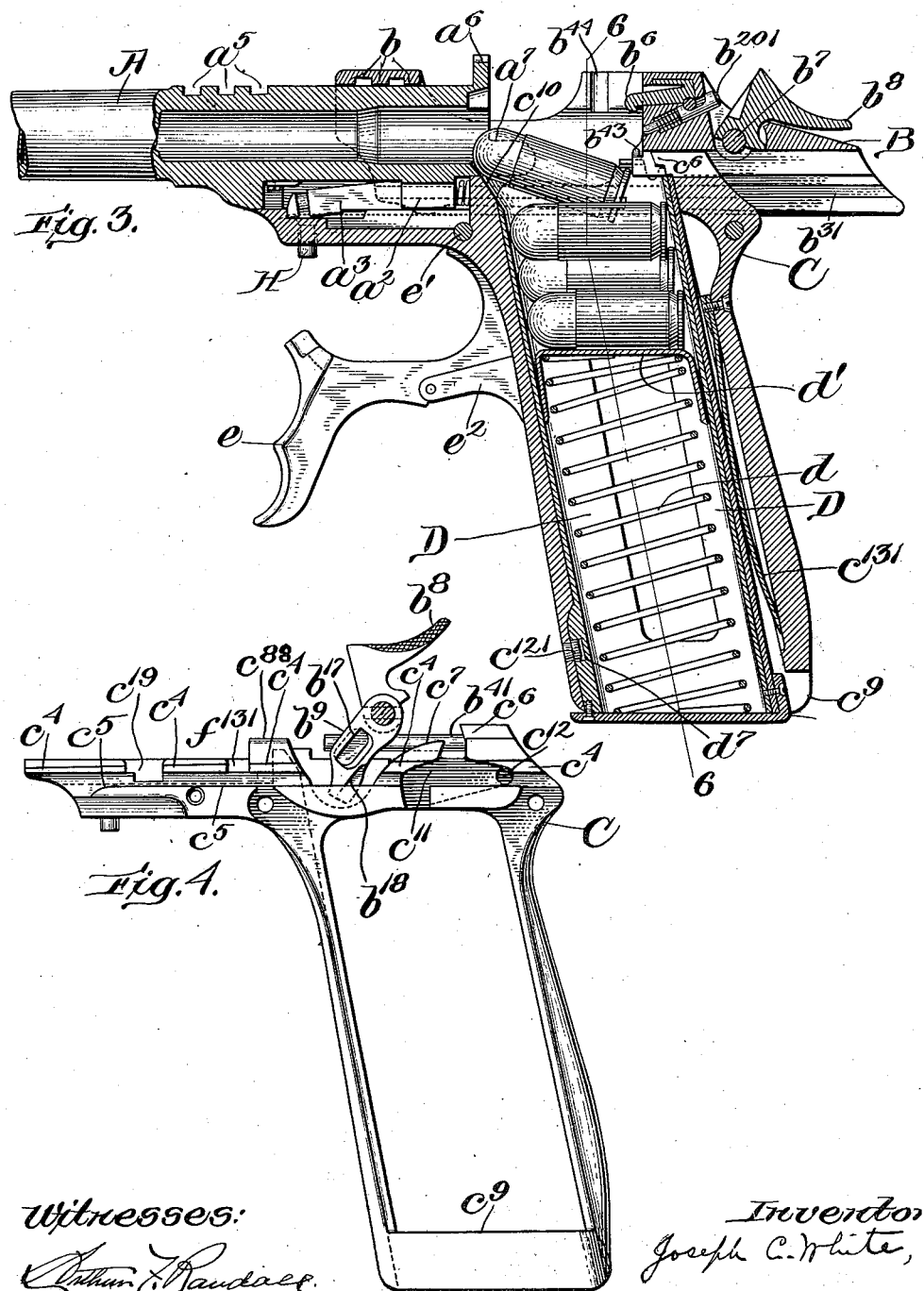

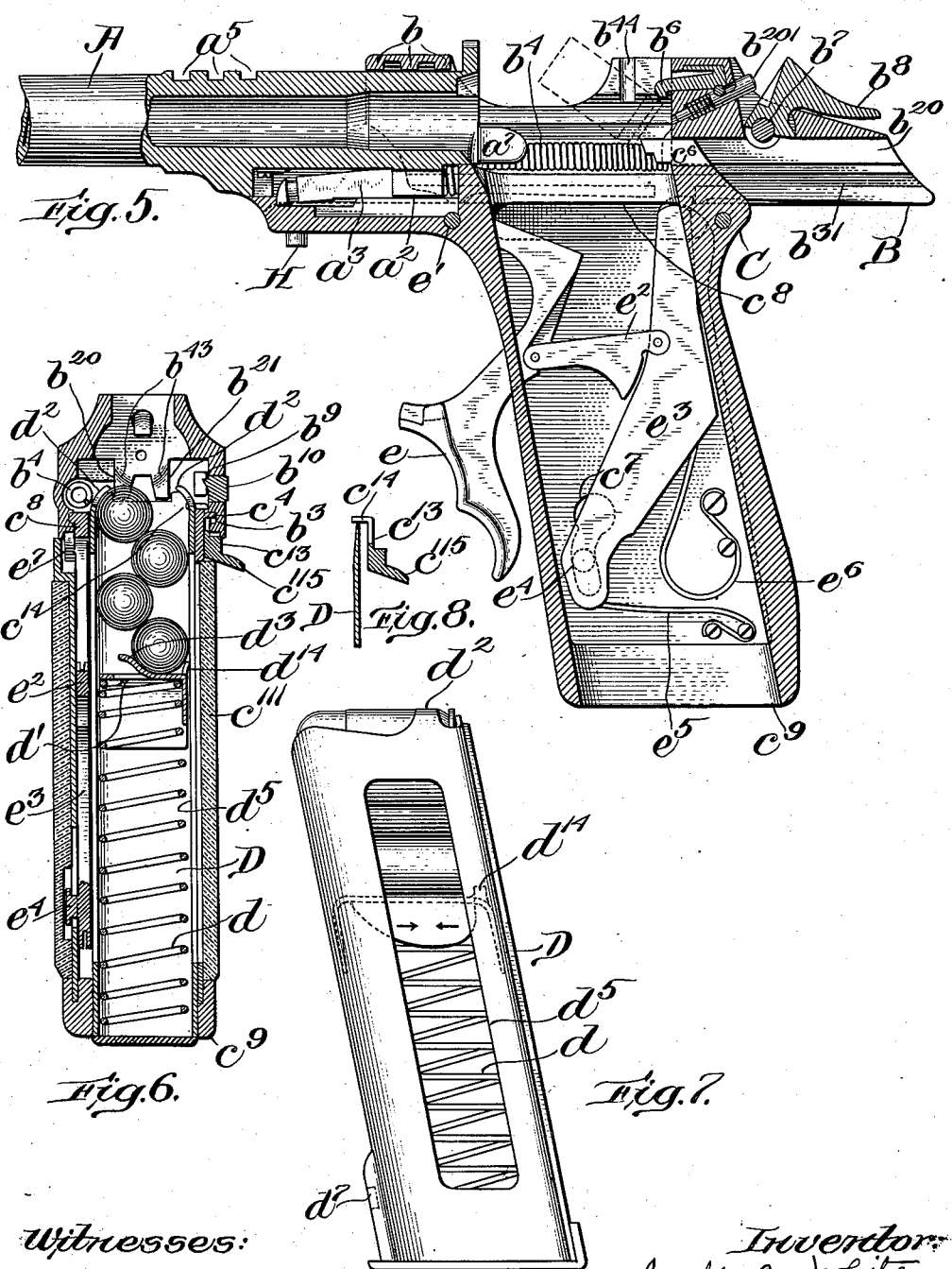

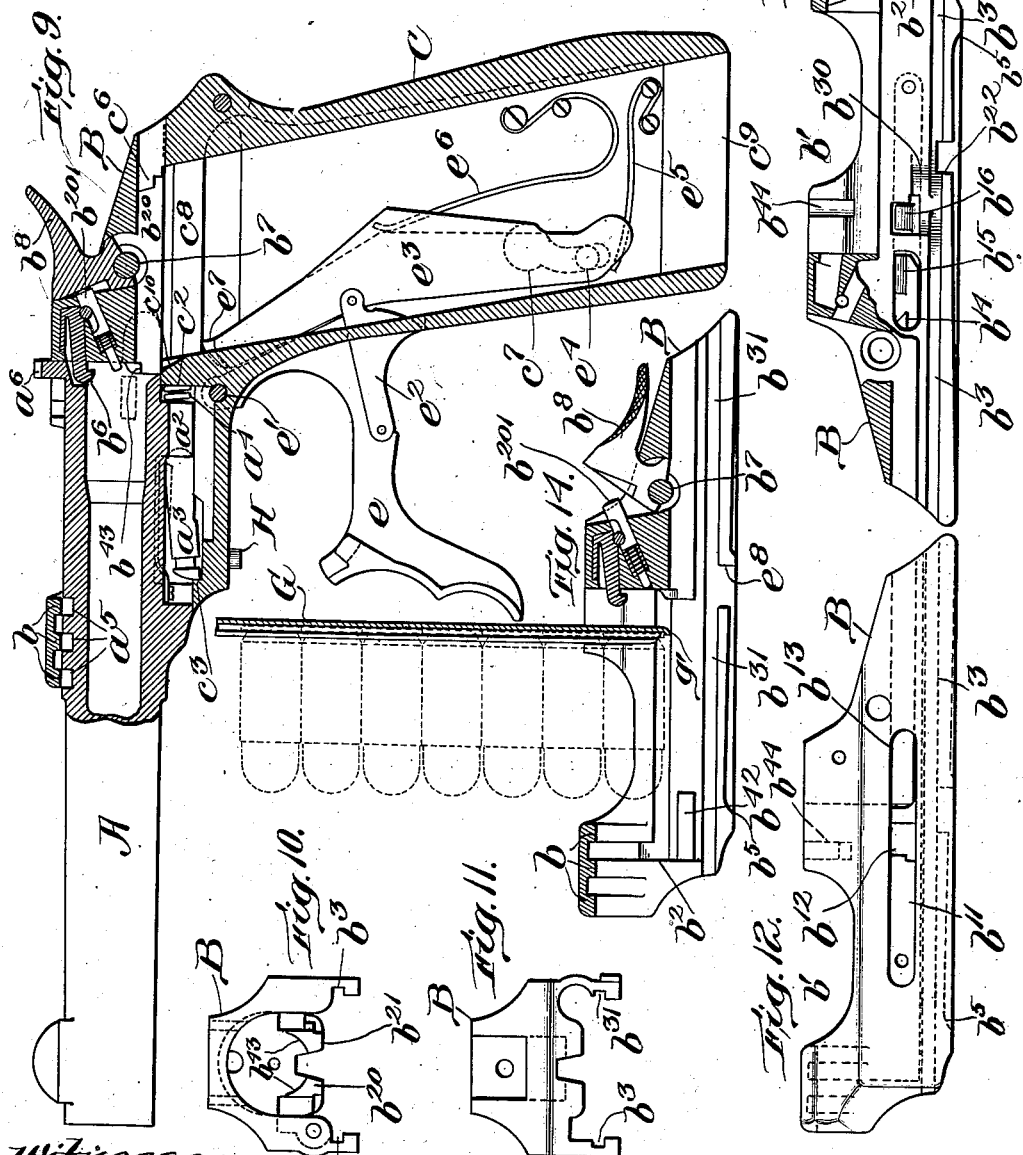

J. C. WHITE.
FIREARM.
APPLICATION FILED MAR. 7, 1907.
954,904.
Patented Apr. 12, 1910.
6 SHEETS—SHEET 5.
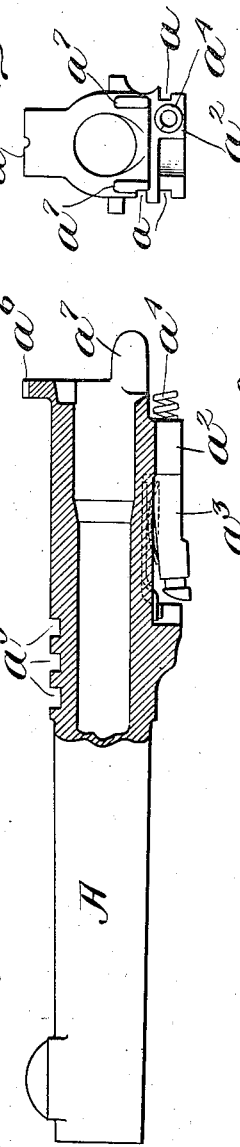
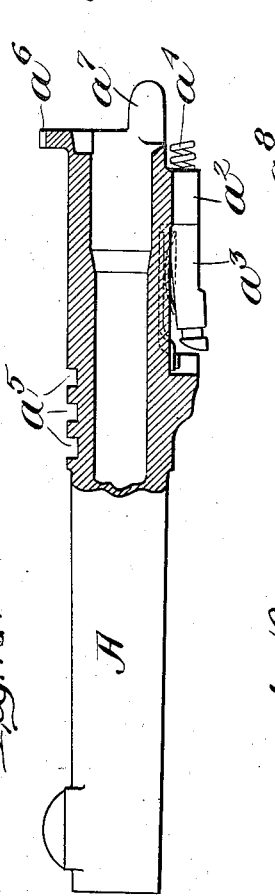
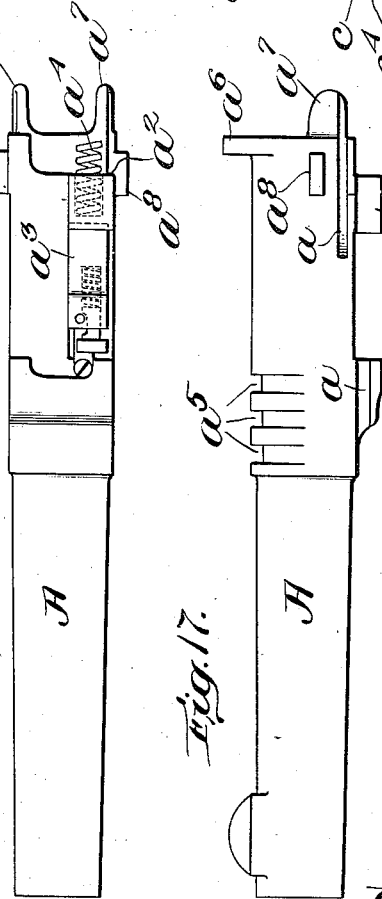
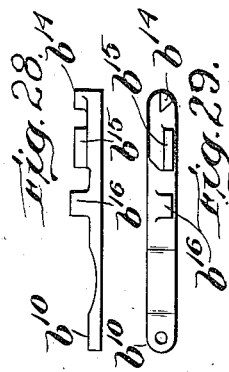
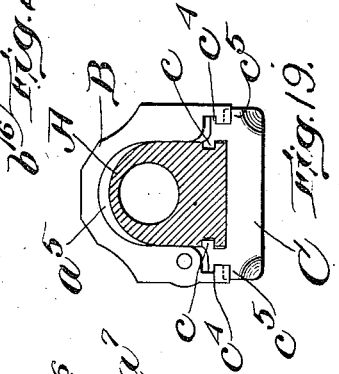
Witnesses:
Inventor:
Joseph C. White
by George A. Rockwell,
Attorney.

J. C. WHITE.
FIREARM.
APPLICATION FILED MAR. 7, 1907.

954,904.

Patented Apr. 12, 1910.

6 SHEETS—SHEET 6.

Witnesses:
Arthur L. Randall
Mary D. Hennessy

Inventor:
Joseph C. White
by George A. Rockwell,
Attorney.

UNITED STATES PATENT OFFICE.

JOSEPH C. WHITE, OF CHELSEA, MASSACHUSETTS, ASSIGNOR, BY DIRECT AND MESNE ASSIGNMENTS, TO WHITE-MERRILL COMPANY, OF BOSTON, MASSACHUSETTS, A CORPORATION OF MASSACHUSETTS.

FIREARM.

954,904.

Specification of Letters Patent. Patented Apr. 12, 1910.

Application filed March 7, 1907. Serial No. 361,195.

*To all whom it may concern:*

Be it known that I, JOSEPH C. WHITE, of Chelsea, in the county of Suffolk and State of Massachusetts, have invented a new and useful Improvement in Firearms, of which the following is a specification.

My invention relates to firearms automatically operating under the action of the recoil to open the breech, eject the spent cartridges and cock the hammer, and under the action of the recoil spring to insert the new cartridge and close the breech.

One object of my invention is to provide a firearm in which both sights are fixed to the barrel.

Another object is to place the hammer in a position readily accessible to the thumb of the user.

A further object is to provide means for transferring a cartridge from the magazine to the barrel or expel a faulty cartridge, which means are controlled by the same hand which holds the firearm.

Another object is to construct the firearm so that the number of cartridges remaining in the piece may be readily ascertained from the exterior.

Other objects will be hereinafter pointed out.

My invention is a firearm of the class above described which in its best form comprises a barrel; a breech block or receiver; a frame on which the barrel and breech block or receiver are mounted with provision for limited movement with relation thereto; a magazine for holding the cartridges; and preferably also means for operating the breech block manually or independently of the recoil.

The prominent feature of the barrel is that its only movement is a limited rectilinear longitudinal or endwise one on the frame under impulse of the recoil when a shot is fired, which movement serves to unlock the breech block so that the latter may be actuated by the remaining force of the recoil to eject the shell of the fired cartridge, to cock the hammer and to reload. The most important features of the breech block or receiver are that it carries the hammer and sear, that it acts efficiently to withdraw the shell of the fired cartridge from the barrel, and that it acts to control the two rows of cartridges for reloading. These features permit of few parts being used and allow the hammer to be placed in position to be conveniently operated by the thumb of the user as in a revolver. The prominent feature of the magazine is the means for indicating the number of cartridges present. The main feature of the means for operating the breech block manually or independently of the recoil is that said means is adapted to open the breech and be operated by the same hand that holds the firearm, so that at will a cartridge can be fed from the magazine to the barrel.

Preferably all of the above features contribute to the best form of my invention but it will be clear from what follows that certain of them may be used to the exclusion of the others or some of the others without departing from my invention.

Other features of my invention, not mentioned above, are hereinafter pointed out.

The invention is shown herein as embodied in a gas-operated magazine-pistol; but it will be understood that the invention is applicable to other firearms. Therefore it is not intended to restrict the present invention to a magazine-pistol nor to any particular kind of firearm nor to the combination of several features of improvement in a single structure.

Figure 21:
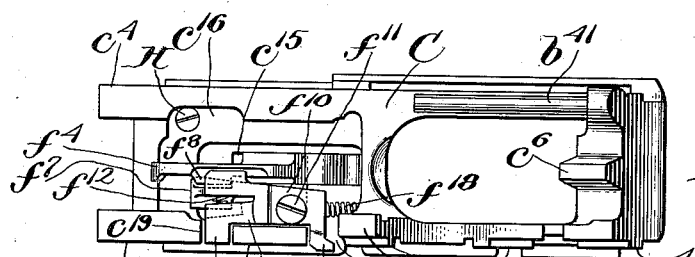
Figure 22:
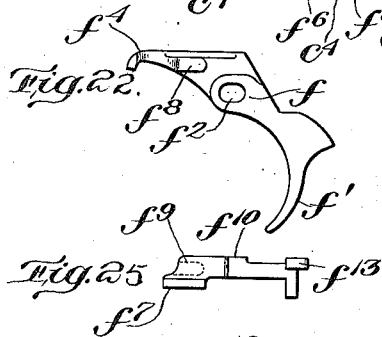
Figure 27:
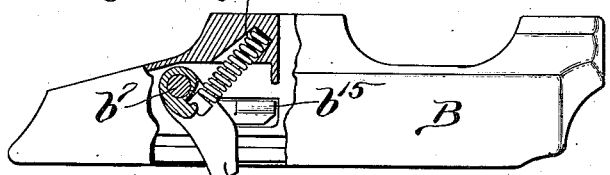
Figure 25:
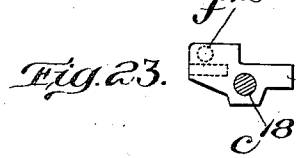
Figure 26:
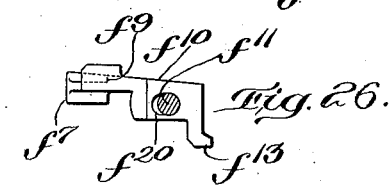
Figures 23, 24:
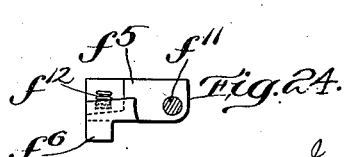

In the accompanying drawings: Figure 1 is a side elevation of my improved firearm; Fig. 2 is a plan view of the firearm shown in Fig. 1; Fig. 3 is a sectional view showing the breech block near its extreme open position; Fig. 4 is a side elevation of the frame; Fig. 5 is a sectional view like Fig. 3 with the magazine removed; Fig. 6 is a section on line 6—6 of Fig. 3; Fig. 7 is a side view of the magazine; Fig. 8 is a detail hereinafter described; Fig. 9 is a view like Fig. 5 but showing the breech block in its closed position; Fig. 10 is a front end view of the breech block; Fig. 11 is a rear end view of the breech block; Fig. 12 is an elevation of one side of the breech block; Fig. 13 is a lengthwise sectional view of the breech block showing the inner face of that side of the breech block shown in Fig. 12; Fig. 14 is a sectional view of the breech block showing the inner face of the side opposite to that shown in Fig. 12, and showing also the manner in which the loading clip hereinafter described is connected with the said breech block; Fig. 15 is a side view partly in section of the barrel; Fig. 16 is a bottom plan view of the barrel shown in Fig. 15; Fig. 17 is a side elevation of the barrel shown in Fig. 15; Fig. 18 is an end view of the barrel shown in Fig. 15; Fig. 19 is a section on line 21—21 of Fig. 1; Fig. 20 is a central longitudinal section of a portion of the firearm shown in Fig. 1; Fig. 21 is a plan view of the frame hereinafter described; Fig. 22 is an elevation of the trigger lever hereinafter described; Figs. 23 and 24 are respectively a side view and a plan view of the main section of the trigger rocker hereinafter described; Figs. 25 and 26 are respectively a side view and a plan view of a supplemental rocker section hereinafter described; Fig. 27 is a side view of the breech block broken away to show the hammer actuating spring; Figs. 28 and 29 are details of the sear.

Having reference to the drawings A is the barrel; B is the breech block; C is the frame; D is the magazine, and $e$, $e'$, etc. the manually controlled means for operating the breech block independently of the recoil.

Near its inner end and upon the exterior thereof barrel A (Figs. 15 to 19) is made with longitudinal grooves $a$ on both sides to engage respectively with tongues $c$ on frame C and thereby prevent lateral movement of barrel A with relation to frame C. Upon the under side of barrel A is a lug $a^2$, the front of which serves as a fulcrum for a spring-pressed buffer latch $a^3$ mounted on barrel A, and in the back of which lug is formed a socket to receive the end of a comparatively stiff spring $a^4$. The opposite end of spring $a^4$ rests against an abutment $c^2$ on frame C while the latch $a^3$ engages an abutment $c^3$ on frame C. In this way barrel A is yieldingly held against forward movement and can yield to a limited extent rearwardly under the pressure of the recoil. On top of barrel A are provided a number of grooves $a^5$ adapted to interlock with a number of tongues $b$ inside breech block B, when the forward end of the latter is depressed as hereinafter described. At the rear end of barrel A is the rear sight $a^6$ extending up through an opening $b'$ in the top of breech block B. Projecting from the rear end of barrel A, one on each side of the mouth of the bore, is a pair of lugs $a^7$ which assist in guiding the forward end of a cartridge into the barrel during the feeding operation hereinafter described. The rear end of barrel A is also made with two radially projecting lugs $a^8$, one at each side thereof, which by engagement with shoulders $b^2$ on the inside of breech block B, serve as stops to limit the rearward or opening movement of said breech block. Thus the shock of arresting the rearward or opening movement of the breech block is transmitted through barrel A to the comparatively stiff spring $a^4$ which bears against the frame and which returns the barrel to its forward position while the breech block is continuing its rearward movement and thus spring $a^4$ is ready to act as a buffer when the shoulders of the breech block engage the barrel lugs.

Mounted loosely in the frame C immediately below the free end of the latch $a^3$ is a plunger H which is used to force the said latch upwardly out of engagement with the shoulder $c^3$ when it is desired to take the firearm apart. When the latch $a^3$ is thus disengaged from the shoulder $c^3$ the barrel is free to be moved forward axially off of frame C drawing breech block B through the engagement of the sight $a^6$ with the forward end of the opening $b'$ of said breech block. During this operation it is necessary to cock the hammer in order that the hammer tail $b^9$ may be elevated above the lug $c^{88}$ of frame C.

The breech block B (Fig. 19) is made at its sides with depending cheek pieces or side walls which receive between them the rear end of barrel A and also the top of frame C and these side walls are made with lengthwise grooves $b^3$ and $b^{31}$ of uniform width throughout their length which engage each with a tongue $c^4$ on frame C extending from front to rear of the latter. The tongues $c^4$ taper in width as shown from their rear ends toward their front ends sufficiently to allow the front end of breech block B to be raised and lowered but only far enough to carry the tongues $b$ into and out of engagement with the grooves $a^5$ of barrel A without raising or lowering the rear end of breech block B. That is to say, in shifting the tongues $b$ into and out of engagement with grooves $a^5$ the breech block is not moved bodily up and down but swings on its rear end as a pivot. Thus it will be seen that the breech block has two movements on frame C, first, a swinging movement to interlock it with and disconnect it from the barrel, and second, a bodily movement back and forth to open and close the breech. Normally the front end of breech block B is held elevated with tongues $b$ out of engagement with grooves $a^5$ by the trigger mechanism to be described later while a recoil spring $b^4$ bearing at one end against breech block B and at its opposite end against frame C acts to hold said breech block closed and to return it to its closed position after it has been opened by the recoil, the rear end of said spring being supported on a pin $b^{41}$ on frame C and its front end on a pin $b^{42}$ on breech block B.

On the underside of each side wall of breech block B and near the front end of the latter is a cam $b^5$ adapted to engage with a cam track $c^5$ on frame C. These cams $b^5$ are produced by milling off the bottom edge of each side wall of the breech block, the cut being deepest adjacent cam $b^5$ and sloping to nothing at the rear end of the breech block. The reason for thus sloping the bottom edge of each side wall of the breech block is to permit the latter to be swung down at its front end as described without having the lower edges of the side walls interfere with the track $c^5$. Normally the cams $b^5$ are forward of and above the front ends of tracks $c^5$ but when the breech block is swung down by operating the trigger to fire the piece the cams $b^5$ are lowered below the tops of tracks $c^5$ so that when the breech block and barrel under the influence of the recoil are forced rearwardly together a short distance the cams $b^5$ ride up onto tracks $c^5$ and the breech block is thus automatically swung upwardly out of engagement with barrel A and continues its travel rearward without the barrel, the latter being in the meantime returned to its normal forward position again by spring $a^4$. The rearward opening movement of breech block B is opposed by the recoil spring $b^4$ and finally stopped by the engagement of the shoulders $b^2$ with lugs $a^8$ after which said breech block is returned to its normal position again by spring $b^4$. During the rearward movement of breech block B the extractor hook $b^6$ carried by the latter pulls the shell of the fired cartridge back with the breech block and against a finger like abutment $c^6$ on frame C as indicated by dotted lines in Fig. 5 which results in the shell being thrown out through the opening $b'$. During the forward movement of breech block B a fresh cartridge is fed from the magazine by the direct action of the breech block and into the breech of barrel A, the piece then being in condition to be fired again. The withdrawal of the shell from the barrel is accomplished by the hook extractor $b^6$, the rim of the shell being held under the extractor hook by lugs $b^{43}$ which also materially aid in feeding the cartridges into the barrel.

Pivotally mounted on a pin $b^7$ extending through breech block B is the hammer $b^8$ to the hub of which is rigidly but removably connected by a tongue and groove connection a tail piece $b^9$ that lies close to one of the side walls of the breech block B as shown in Fig. 6 to coöperate with the sear or hammer latch $b^{10}$ mounted on said side wall as shown in said figure. There is also provided on frame C a hammer cocking cam $c^7$ that lies in the path of the tail piece $b^9$ so that during the rearward movement of breech block B the tail piece $b^9$ by riding up on this cam $c^7$ cocks the hammer and at the same time the tail piece is caught and held by the sear $b^{10}$ as shown in Fig. 6.

The sear $b^{10}$ is a leaf spring (Figs. 12, 13, 28 and 29) mounted in a pocket $b^{11}$ formed in the exterior of the breech block and within this pocket the wall of the breech block is perforated at $b^{12}$ and $b^{13}$. On the inner side of sear $b^{10}$ are three lugs $b^{14}$, $b^{15}$ and $b^{16}$, the lugs $b^{14}$ and $b^{15}$ extending through the perforation $b^{13}$ to coöperate with the hammer tail $b^9$, and the lug $b^{16}$ extending through perforation $b^{12}$ to coöperate with a firing cam lug $c^{88}$ on frame C. The lug $b^{14}$ engages the hammer tail piece $b^9$ at $b^{17}$ to hold the hammer at half cock while the lug $b^{15}$ engages the hammer tail piece $b^9$ at $b^{18}$ to hold the hammer at full cock. The lug $c^{88}$ is situated on frame C so that when the breech block while in its forward position is swung down by means of the trigger mechanism as stated above, the lug $b^{16}$ is carried against lug $c^{88}$ thereby forcing the sear sidewise away from and out of engagement with the hammer tail piece. It will be clear that by this means the hammer cannot be released until the breech is fully locked to the barrel. The hammer $b^8$ being then free is thrown by the hammer spring $b^{81}$ located within and at one side of the breech block and engaging the hammer tail piece $b^9$, against the usual firing pin $b^{201}$ to explode the cartridge. The engagement of lugs $b^{16}$ and $c^8$ is timed of course to occur just after the tongues $b$ have entered the grooves $a^5$ so that the breech is locked to the barrel just before the cartridge is exploded, and when the cartridge is exploded the barrel and breech block move rearwardly together until disconnected by cams $b^5$ engaging track $c^5$ as already described.

The manually controlled means for operating the breech block independently of the recoil comprises a spur or lever $e$ pivoted at $e'$ to frame C and connected by a link $e^2$ with a lever $e^3$. The lever $e^3$ at its lower end carries a stud $e^4$ engaging a slot $c^7$ in the frame C and is pressed upwardly and forwardly by two springs $e^5$ and $e^6$ which engage the end and side respectively of lever $e^3$. The top of lever $e^3$ has an offset $e^7$ which lies immediately below the lower edge of one of the side walls of breech block B and this side wall is cut away as shown in Fig. 14 so as to provide a shoulder $e^8$ to coöperate with the offset upper end of lever $e^3$. Immediately above the upper end of lever $e^3$ is a bar $c^8$ which is part of frame C and against the under side of this bar the top of lever $e^3$ is held by the spring $e^5$. At each end the bar $c^8$ curves downwardly so that if the upper end of lever $e^3$ is moved along bar $c^8$ from the position shown in Fig. 9 to the opposite end of the bar, then the upper end of said lever will first rise toward the breech block and then travel straight toward the rear and then descend away from the breech block. The shoulder $e^8$ normally lies just above the upper end of lever $e^8$ and therefore it will be obvious that when lever $e$ is operated to shift lever $e^3$ along bar $c^8$ as described, said lever $e^3$ will rise so that its offset $e^7$ engages shoulder $e^8$ and then in moving toward the rear the breech block will be carried rearwardly by the lever $e^3$ until the latter is depressed by the downwardly curved rear end of the underside of bar $c^8$. The breech block being then free is returned to normal position by spring $b^4$. If, however, it is desired to draw the breech block partway back then lever $e^8$ is not moved rearwardly far enough to be depressed by the rear end of bar $c^8$, but only as far as shown in Fig. 5.

The frame C is extended downwardly to form the handle $c^9$ of the firearm and this handle, as shown, is hollow to serve as a holder for the magazine, the lower end of handle $c^9$ being left open to provide an entrance and exit for the magazine. The magazine, as shown in Figs. 3, 6 and 7, is a somewhat oblong box open at its upper end and within which is arranged a spring $d$ that supports a follower $d'$. The cartridges are crowded into the open end of magazine D onto follower $d'$ and are held within the magazine by inwardly turned lugs $d^2$ at the open end of the magazine, against which the column of cartridges is pressed by spring $d$. A peculiar feature of the magazine is that it is greater in width than a single cartridge and less in width than two cartridges placed side by side, the result of which is that the cartridges are held in staggered relation as shown in Fig. 6 and are presented one at a time at the discharge end of the magazine, first one and then the other stop lug $d^2$ serving to hold the cartridges in place as the topmost ones are removed. It will thus be seen that the cartridges are held within the magazine in two rows or ranks with the cartridges of one row alternating with those of the other row and that the topmost cartridge of first one row and then the other is presented at the top of the magazine. This construction of magazine gives greater capacity than heretofore and at the same time does not require lengthening of handle $c^9$ nor any material widening thereof.

In order to insure the proper positioning of the first cartridge placed in the magazine the follower $d'$ is made with a struck-up lip $d^3$ which deflects the first cartridge against one side of the magazine and the following cartridges will find their own proper positions as they are inserted.

Upon its under side and near the rear end thereof the breech block B is made with two feeding lugs $b^{20}$ and $b^{21}$ and one of these lugs travels back and forth with the breech block over one of the rows of cartridges in magazine D while the other lug travels back and forth over the other row. Every other time the breech block travels forward from its open position the lug $b^{20}$ strikes the rear end of the topmost cartridge of that row immediately below it and feeds that cartridge forward up an incline $c^{10}$ on frame C and into the breech of barrel A, while the lug $b^{21}$ acts likewise upon the topmost cartridge of its row at each alternate trip forward of the breech block. It is during these feeding operations that the lugs $a^7$ assist in guiding the cartridges into the barrel.

It is desirable that when the cartridges in magazine D are exhausted the user may be notified of this fact and for this reason I provide the following: On one side and near the top of frame C is formed a pocket $c^{11}$ in which is pivoted at $c^{12}$ a latch $c^{13}$ made with an upward and lateral extension $c^{14}$ which passes over the top of frame C and magazine D as shown in Fig. 8, and lies in the path of a lug $d^{14}$ on follower $d'$. As shown in Fig. 6, the latch $c^{13}$ extends under the lower edge of one of the side walls of breech block B and this side wall is cut away so as to provide a recess having a shoulder $b^{22}$ to coöperate with latch $c^{13}$ (Fig. 13). When the last cartridge is removed from the magazine the spring $d$ acts to lift follower $d'$ and lug $d^{14}$ acts on extension $c^{14}$ to press latch $c^{13}$ against the under side of the side wall of breech block B so that when this last cartridge is fired and the breech block is thrown back by the recoil the latch $c^{13}$ engages the shoulder $b^{22}$ and thereby holds the breech block open. After the magazine has been refilled the breech block is freed from latch $c^{13}$ by depressing a thumb piece $c^{115}$ projecting outwardly from said latch. It is also desirable that the user may be able to tell at a glance how many cartridges are in the magazine and for this reason the side wall of magazine D is made with a slot $d^5$, while the adjacent wall $c^{111}$ of handle $c^9$ is made of transparent material such as celluloid or the like through which and slot $d^5$, the contents of the magazine may be seen. The number of cartridges remaining in magazine D may also be indicated by providing the follower $d'$ with a depending lip $d^6$ having on its outer face one or more marks to coöperate with an index marked on the transparent wall $c^{111}$.

For holding the magazine D within the handle $c^9$ I provide within the latter a stud $c^{121}$ to engage a socket $d^7$ on magazine D said stud and socket being held in engagement by a leaf spring $c^{131}$ fixed within handle $c^9$. In order to provide for the ready removal and insertion of the magazine the lower end of the chamber of handle $c^9$ is made wide enough to permit magazine D to be forced against spring $c^{131}$ away from stud $c^{121}$ far enough to permit its withdrawal or insertion.

The trigger mechanism is mounted on the top of frame C just below barrel A and as already stated this mechanism does not act directly on the hammer tail or the sear but on the breech block B to swing the latter as above described and thereby free the hammer.

The trigger $f$ is made with the usual finger-piece $f'$ and is pivotally mounted in a slot $c^{15}$ formed through the bottom of a pocket or chamber $c^{16}$ provided on top of frame C to receive the trigger mechanism. Integral with frame C and surrounding trigger $f$ is a trigger guard $c^{17}$. The trigger $f$ is supported by a pin $c^{18}$ that extends through a slot $f^2$ in the trigger $f$ so that the latter cannot only swing on pin $c^{18}$ but also slide back and forth to a limited extent; a spring $f^3$, however, holds the trigger forward with the rear end of slot $f^2$ against pin $c^{18}$; it also holds the finger piece $f'$ in forward position, and an arm $f^4$ on the inner end of the trigger elevated. On the pin $c^{18}$ and alongside the trigger is a rocker $f^5$ which has only a rocking movement on pin $c^{18}$. Projecting laterally from rocker $f^5$ through a notch $c^{19}$ in the top of frame C is a lug $f^6$ which normally projects into groove $b^3$ of breech block B. The rocker includes also a supplemental section $f^{10}$ secured to the top of the main section $f^5$ by a screw $f^{11}$, the section $f^{10}$ being made with a slot $f^{20}$ through which screw $f^{11}$ extends so that section $f^{10}$ can swing on screw $f^{11}$ as well as move bodily back and forth on the lower section $f^5$, but normally section $f^{10}$ is pressed and held forward by a spring $f^{18}$.

At its forward end the rocker section $f^{10}$ is made with a lip $f^7$ normally resting on a shoulder or ledge $c^{20}$ on frame C so that normally the engagement of lip $f^7$ with shoulder $c^{20}$ and the engagement of lug $f^6$ with groove $b^3$ of breech block B, locks the forward end of the latter in an elevated position so that it cannot be accidentally pressed down and the piece thereby accidentally discharged.

Projecting from the side of the arm $f^4$ of the trigger toward rocker section $f^{10}$ is a lug $f^8$ which normally is in engagement with a socket $f^9$ in the adjacent side of section $f^{10}$ so that when pressure is applied properly to the finger piece of the trigger, the trigger and rocker section $f^{10}$ are first slid backward far enough to carry lip $f^7$ off of shoulder $c^{20}$ and then the trigger and both rocker sections $f^5$ and $f^{10}$ swing on pin $c^{18}$. This depresses lug $f^6$ and the latter pressing on the bottom of groove $b^3$ swings the forward end of breech block B down so as to lock it to barrel A and then free the hammer and fire the cartridge as above described. The breech block B then opens and closes as already described the hammer being automatically cocked as the breech block opens and a fresh cartridge being fed into the barrel as the breech block closes. In order that lug $c^8$ cannot automatically operate the sear and fire the fresh cartridge, if pressure is maintained on the finger-piece of the trigger as the breech block returns, the rocker sections $f^5$, $f^{10}$, are automatically disconnected from the trigger immediately after the cartridge is fired, as follows:

Normally a spring $f^{12}$ holds the forward end of section $f^{10}$ in engagement with the trigger arm $f^4$ with a lug $f^{13}$ on the rear end of section $f^{10}$ projecting through a notch $f^{131}$ in the top of frame C into groove $b^3$. When the trigger is operated as above described to fire the piece the lug $f^{13}$ is raised above the plane of groove $b^3$ into the path of a cam surface $b^{30}$ on the interior of breech block B and as soon as the recoil forces the breech block back the cam surface $b^{30}$ strikes lug $f^{13}$ and swings section $f^{10}$ on screw $f^{11}$ far enough to free the rocker from the trigger. As soon thereafter as the cams $b^5$ ride up onto tracks $c^5$ of course lug $f^6$ is lifted and this throws lug $f^{13}$ downward opposite or into the plane of groove $b^3$ into which spring $f^{12}$ tends to force it. As soon as the trigger is released its spring $f^3$ raises arm $f^4$ so as to bring lug $f^8$ opposite socket $f^9$ which allows spring $f^{12}$ to swing section $f^{10}$ back to normal position carrying lug $f^{13}$ into groove $b^3$. It will thus be seen that immediately after the cartridge is fired the trigger lever $f$ is disconnected from the rocker made up of sections $f^5$ and $f^{10}$ so that if pressure is maintained on the trigger until the breech block returns to normal position again the rocker will be permitted to return to normal position with the lip $f^7$ over the shoulder $c^{20}$, but the trigger will remain disconnected from the rocker until the pressure of the finger is relieved, and the arm $f^4$ is permitted to rise to its normal position so as to bring lug $f^8$ to register with socket $f^9$. Therefore even if pressure be maintained on the trigger after the breech block has been returned to normal position the engagement of lip $f^7$ with shoulder $c^{20}$ prevents accidental movement of the breech block which would result in a second discharge of the piece. That is, the trigger $f$ must be permitted to return to normal position after each firing operation in order to be able to fire the piece again.

Normally the inner end of the arm $f^4$ is immediately above a shoulder or ledge $c^{25}$ on frame C, and when the finger-piece $f'$ is pressed to fire the cartridge the arm $f^4$ slides rearwardly on the ledge $c^{25}$ until the lip $f^7$ clears the shoulder $c^{20}$. The reason for this is that the lip $f^7$ is a comparatively short distance from the pin $c^8$, and without the finger $f^4$ the said lip $f^7$ would be pressed so strongly against shoulder $c^{20}$ that the resulting friction would interfere with the rearward movement of the section $f^{10}$, whereas by providing the finger $f^4$ to prevent undue friction between $f^7$ and $c^{20}$ the contacting end of the arm $f^4$ may be arranged so far from the pin $c^{18}$ that the friction between arm $f^4$ and shoulder $c^{25}$ will not be enough to interfere with the rearward movement of the section $f^{10}$ or the trigger. Thus, as a matter of fact, normally the finger $f^4$ engaging shoulder $c^{25}$ coöperates with the lip $f^7$ engaging shoulder $c^{20}$ in preventing accidental firing of the piece due for example to pressure upward on the forward end of the breech block. At the same time it is to be remembered that after the piece has been fired and the breech block is opened and closed section $f^{10}$ returns to its forward position with the lip $f^7$ over the shoulder $c^{20}$ so that then the engagement of $f^7$ and $c^{20}$ is a means for preventing accidental discharge of the piece should the user continue to hold the trigger in its rearward position.

In loading the magazine three methods may be employed: First, the magazine may be withdrawn from the handle $c^9$ and reloaded by inserting the cartridges one at a time in the open end thereof. Second, opening the breech block by means of the spur or lever E and inserting the cartridges one at a time down through the opening $b'$ in the breech block and into the open end of the magazine; and third, by the employment of a clip attachment. When a loaded clip is connected with the breech the operator by pressing upon the upper end of the row of cartridges held by the clip forces the cartridges down into the magazine D. The clip is then removed and as soon as the breech block is allowed to close it picks off the top cartridge and carries it forward into barrel A in the manner already described, and the piece is in condition for firing.

The foregoing description will make plain the method of operation of my improved firearm. The handle of the weapon is held in the right hand and the breech block is drawn back, either by the left hand grasping the breech block and pulling it in a rearward direction, or by the right hand operating the loading lever. As the breech block moves backward the hammer is automatically cocked. If an empty magazine is in its position in the handle the latch on the frame will now lock the retreating breech block in its open position. A clip of cartridges is inserted in the opening in the top of the breech block or receiver, the edges of the clip fitting in slots in the receiver near the rear end of the opening. The cartridges are pressed downward from the clip into the magazine by the thumb of the left hand, and lodge alternately from side to side against the walls of the magazine. The clip is withdrawn, the latch is pressed downward with the right thumb, and the breech block is moved forward under the impulse of the recoil spring, pushing the topmost cartridge in the magazine forward into the chamber of the barrel. On pulling the trigger the breech block is now forced into locked engagement with the barrel, which causes a release of the hammer, and a shot is fired. The pressure of the powder gases in the barrel imparts a forward impulse to the bullet, and at the same time a rearward movement to the breech block and barrel. After the bullet has had time to pass beyond the muzzle of the barrel, the forward end of the breech block is lifted by cam tracks on the frame out of engagement with the barrel, whereupon the barrel returns to its forward position while the breech block continues its rearward movement. In its retreat the breech block extracts the empty cartridge shell, ejects it, cocks the hammer, and passes in the rear of the head of the topmost cartridge in the magazine, compressing the recoil spring as it moves backward. After its retreat is finally arrested by the frame the breech block is driven forward by the recoil spring, reloading the weapon as before, and leaving it ready for the next shot. These operations are repeated as long as cartridges are supplied, provided the trigger is released and pulled for each shot.

If preferred the magazine may be removed and charged by inserting cartridges singly. The firearm is then loaded by inserting the magazine containing cartridges in the handle, and pulling back the breech block, either by the left hand, as above described, or by the loading lever operated by the right hand. In this case the cartridges in the magazine depress the magazine follower and prevent the latch from locking the breech block in its open position, with the result that the breech block is free to spring forward, leaving the firearm loaded and cocked ready for firing as before.

In using my improved firearm as a single-loader the breech is opened as already described, an empty magazine being in position in the handle, and the breech block being held in its rearward position automatically by the latch. A cartridge is then dropped upon the magazine follower through the open top of the breech block or receiver. The latch is now depressed by the thumb, and the breech block is driven forward by the recoil spring as before, carrying the cartridge into the chamber of the barrel. When fired the action remains open, by reason of the magazine being empty. The user of the firearm may now drop in another cartridge and again release the latch, and discharge successive shots in the same manner.

From the above description it will be clear that there are manifold advantages of my firearm, but it may be useful to point out more particularly some of the more important ones, for example, the sights are fixed to the barrel, which moves along its own axis during the process of unlocking from the breech and for the purpose of returning to the normal position, and this movement being a rectilinear one, the barrel will not get out of alinement with the sights and therefore become inaccurate. Another advantage of the barrel is that it yieldingly limits the motion of the breech block when the latter has reached its rearmost position.

The advantage of my loading lever is that a cartridge may be transferred from the magazine to the barrel or a faulty cartridge expelled by the same hand which holds the firearm, that is to say, if the breech were closed, and it were desired to accomplish either of the above purposes, this could be done with the right hand, for example, while the left hand might be otherwise employed, or if the left hand were disabled, which would be an important consideration if the weapon were used in military service.

The ease of dismounting the piece is especially noteworthy, and is due to a simple but effective connection between the several elements of the firearm, and it is to be noted also as a distinct advantage that the barrel and breech block must move forward to be removed from the frame, the importance of this being clear in case of an accident to the piece, as in this case the barrel and receiver would be thrown forward and not into the face of the user. Another advantage is my arrangement by which the interior of the magazine may at any time be seen without the removal of any part of the pistol and without any movement of any part of the mechanism, as also without the aid of the left hand. For a weapon designed to be used in warfare this improvement is of the highest importance. My arrangement for giving this indication is simple and very practical. Another advantage is to have the breech block normally unlocked from the barrel in order that the breech block may be retracted freely by the loading spur without encountering the pressure of the barrel recoil spring.

I can not only use the magazine to supply cartridges but I may also use one cartridge at a time and load from the top of the breech with greater ease than in other pistols, and this is a distinct advantage in many cases, and furthermore, I can load the magazine without removing it from the handle by using a clip filled with cartridges, and this clip will be inserted at the top of the breech so that the cartridges will take their proper positions in the magazine in accordance with the present method highly approved in military service.

It will be seen that my firearm, unlike most automatic firearms, retains the advantages common to most revolvers, viz: ease of raising or lowering the hammer with the hand used in firing; convenience of ascertaining how many cartridges remain in the arm unexpended; means for removing a defective cartridge without the aid of the hand not commonly used in firing; and a barrel to which both sights are rigidly fixed.

What I claim is:

1. In a firearm the combination of a fixed member; a movable member carrying a sear; and means to move the movable member to bring the sear into engagement with the fixed member and thereby operate the sear.

2. In a firearm the combination of a frame; a member fixed to the frame; a movable breech block carrying a sear; and means to move the breech block to bring the sear into engagement with the fixed member and thereby operate the sear.

3. In a firearm the combination of a frame; a movable member mounted on the frame and carrying a hammer; and a fixed member on the frame acting directly on the hammer to cock it.

4. In a firearm the combination of a frame; a breech block movably mounted on the frame and carrying a hammer and a sear; a fixed member on the frame acting directly on the hammer to cock it; and a second fixed member on the frame to disengage the sear from the hammer.

5. In an automatic firearm the combination of a frame; a barrel mounted on the frame; an automatically-operated breech-closing member movably mounted on the frame; trigger mechanism; and means controlled by the trigger mechanism for holding the breech-closing member in proper relation with the barrel during the firing and automatic means for releasing said holding means from the control of the trigger mechanism when the bullet leaves the barrel.

6. In an automatic firearm the combination of a frame; a barrel mounted on the frame and having means to engage locking means on the breech-block; a breech block movably mounted on the frame and having locking means to engage said means on the barrel and thereby prevent relative longitudinal movement between the barrel and breech block during that engagement; firing mechanism including a trigger; and means controlled by the trigger for bringing the locking means of the breech block into engagement with the means on the barrel; and means to automatically unlock the breech block from the barrel.

7. In a firearm the combination of a frame; a barrel movably mounted on the frame and having means to engage locking means on the breech block; a breech block movably mounted on the frame and having locking means to engage said means on the barrel and thereby prevent relative longitudinal movement between the barrel and breech block during that engagement; firing mechanism including a trigger; means controlled by the trigger for bringing the locking means of the breech block into engagement with the means on the barrel; and means to unlock the breech block from the barrel when they are moved rearwardly under the influence of the recoil.

8. In a firearm the combination of a frame; a barrel on the frame; a breech block mounted to swing on the frame and to move lengthwise to eject and reload; trigger mechanism; means controlled by the trigger mechanism but independent of the hammer to swing the breech block on the frame to lock it to the barrel in its closed position; and means to unlock the breech block from the barrel.

9. In a firearm the combination of a frame; a barrel movably mounted on the frame; a breech block mounted to swing on the frame and to move lengthwise independently of the barrel to eject and reload; trigger mechanism; means controlled by the trigger mechanism but independent of the hammer to swing the breech block on the frame to lock it to the barrel in its closed position; and means to unlock the breech block from the barrel.

10. In a firearm the combination of a frame; a barrel on the frame; a breech block mounted on the frame to have a forward and backward longitudinal movement; and means on the barrel for yieldingly limiting the forward movement of the breech block.

11. In a firearm the combination of a frame; a barrel on the frame; a breech block movably mounted on the frame to have forward and backward longitudinal movement; and means on the barrel for yieldingly limiting both longitudinal movements of the breech block.

12. In a firearm the combination of a frame; a breech block movably mounted on the frame; automatic means for operating the breech block; and means operated by the firing hand for retracting the breech block.

13. In a firearm the combination of a frame; a breech block movably mounted on the frame; automatic means for operating the breech block; and means controlled by the firing hand for operating the breech block independently of the recoil.

14. In a firearm the combination of a frame; a breech block movably mounted on the frame; automatic means for operating the breech block; and means controlled by the firing hand for retracting the breech block for the purpose of reloading and for then releasing the breech block from that control.

15. In a firearm the combination of a frame; a breech block movably mounted on the frame; automatic means for operating the breech block; a spur; and means connected with the spur through which the latter operates the breech block.

16. A firearm having a handle constructed as a magazine, the handle being so made that normally the contents thereof may be seen from the exterior and a transparent celluloid closure for the opening in the handle.

17. In a firearm the combination of a handle with an opening and a magazine with an opening registering with the opening in the handle so that the interior of the magazine can be seen through those openings; and a transparent celluloid closure for the opening in the handle.

18. In a firearm the combination of a removable magazine within the firearm; and means within the firearm but visible from the exterior for indicating the number of cartridges in the magazine.

19. In a firearm the combination of a removable magazine within the firearm and having a follower; and a fixed scale within the firearm and coöperating with the follower to indicate the number of cartridges in the magazine.

20. In a firearm the combination of a removable magazine within the firearm and having a follower; a fixed scale within the firearm and coöperating with the follower to indicate the number of cartridges in the magazine; and a transparent closure for the coöperating follower and scale.

21. In a firearm of the character described the combination of a removable magazine having a follower; a handle to receive the magazine and having an opening through which the follower can be seen; a transparent closure for the opening in the handle which has a scale to coöperate with the follower to indicate the number of cartridges in the firearm.

22. In a firearm the combination of a frame; a barrel having a front and a rear sight; a breech block movably mounted on the frame and inclosing the rear end of the barrel and being formed at its top with an ejecting opening through which the rear sight projects.

23. In a firearm the combination of a frame; a breech block; a barrel; the breech block and barrel being joined to the frame by tongue and groove connections, with the breech block held in place by the barrel; a latch for holding the barrel in place; means accessible from the exterior of the piece for operating the latch to free the barrel and breech block so that they can be removed from the frame.

24. In a firearm the combination of a frame; a breech block; a barrel; the breech block and barrel being joined to the frame by tongue and groove connections, with the breech block held in place by the barrel; a buffer latch for holding the barrel in place;

and means accessible from the exterior of the firearm for operating the latch to free the barrel and breech block so that they can be removed from the frame.

25. In a firearm the combination of a breech block movable in one direction under the influence of the recoil and in another direction to close the breech; a trigger normally connected with the breech block; means operated by the trigger but independent of the hammer for moving the breech block to operate the sear; and means to automatically disconnect the trigger and breech block when the cartridge is fired so that the breech block can return to normal position independently of the trigger.

26. In a firearm the combination of a breech block movable in one direction under the influence of the recoil, and in another direction to fire the cartridge; a trigger normally connected with the breech block; means operated by the trigger but independent of the hammer for moving the breech block to operate the sear; and means to automatically disengage the trigger and breech block when a cartridge is fired so that the breech block can return to normal position independently of the trigger; and means for holding the breech block in that position against accidental discharge when the trigger is out of engagement with the locking mechanism.

27. In a firearm the combination of a breech block movable in one direction to close the breech; a trigger normally connected with the breech block; means operated by the trigger but independent of the hammer for moving the breech block to operate the sear; and means to automatically disconnect the trigger and breech block when the cartridge is fired so that the breech block can return to normal position independently of the trigger and to automatically connect said parts when the trigger returns to normal position.

28. In a firearm the combination of the barrel A, the breech block B, the frame C, trigger lever $f$, and a rocker controlled by the trigger lever $f$ to operate the breech block to fire the piece, and controlled by the breech block B so as to be disconnected from the trigger lever $f$ when the piece is fired, and to remain so disconnected until the trigger lever $f$ is returned to normal position, said rocker coöperating with the abutment $c^{20}$, substantially as described.

JOSEPH C. WHITE.

Witnesses:
  G. A. ROCKWELL,
  M. G. HENNESSY.